April 4, 1961   T. W. MARTINEK   2,978,621
MOTOR

Filed Sept. 16, 1958   2 Sheets-Sheet 1

INVENTOR.
THOMAS W. MARTINEK
BY Edward H. Lang
ATTORNEY

April 4, 1961     T. W. MARTINEK     2,978,621

MOTOR

Filed Sept. 16, 1958     2 Sheets-Sheet 2

INVENTOR.
THOMAS W. MARTINEK
BY
*Edward H. Lang*
ATTORNEY

United States Patent Office 2,978,621
Patented Apr. 4, 1961

2,978,621
MOTOR

Thomas W. Martinek, Crystal Lake, Ill., assignor to The Pure Oil Company, Chicago, Ill., a corporation of Ohio Filed Sept. 16, 1958, Ser. No. 761,334
13 Claims. (Cl. 318—29)

This invention relates to electric motors, and is more particularly concerned with an electric motor adapted to start under no-load or light-load conditions.

It is common practice to utilize electric motors in servo-mechanisms for operating devices such as railway, bus and garage doors, reciprocating pistons and valves, and control elements in an airplane such as rudders, ailerons, wing-flaps and the pitch of propeller blades. In these various services the rotary motion of the motor is converted into straight-line motion. Frequently, the load is so great that the starting torque on the motor exceeds the capacity of the motor, with the result that the motor fails to start or burns out.

An object of this invention is to provide an improved motor for converting rotary into straight-line motion. Another object of the invention is to provide a motor which will start under no-load or light-load conditions and will automatically pick up the load after the armature has attained sufficient rotational speed to drive the load. A further object of the invention is to provide a motor which converts rotary to reciprocating motion. Still another object of the invention is to provide a motor capable of moving a load to a predetermined position.

Figure 1:
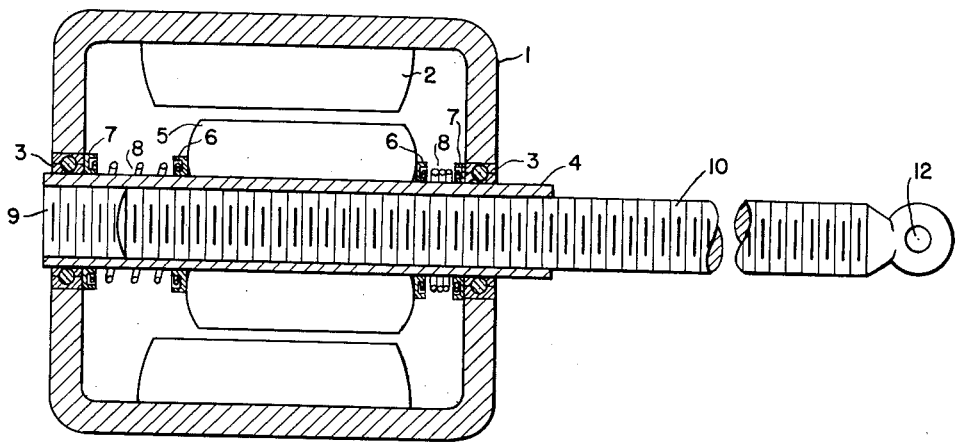
Figure 2:
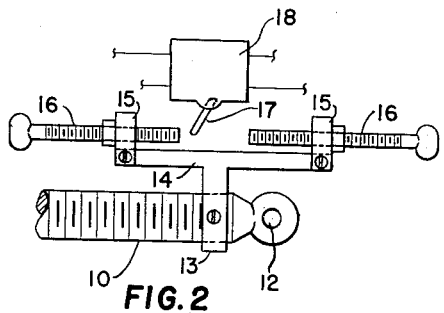
Figure 3:
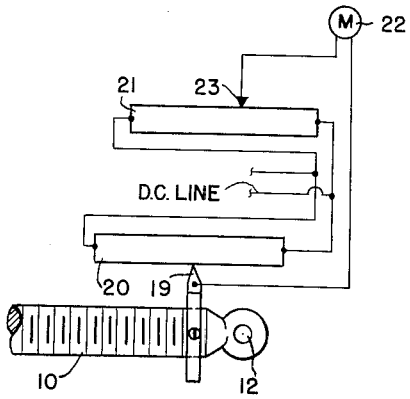
Figure 4:
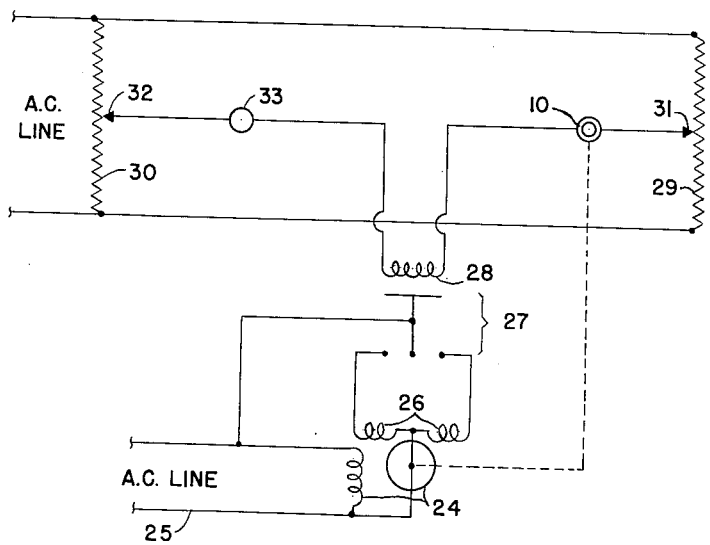
Figure 5:
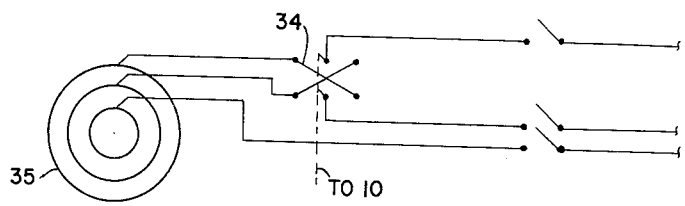
Figure 6:
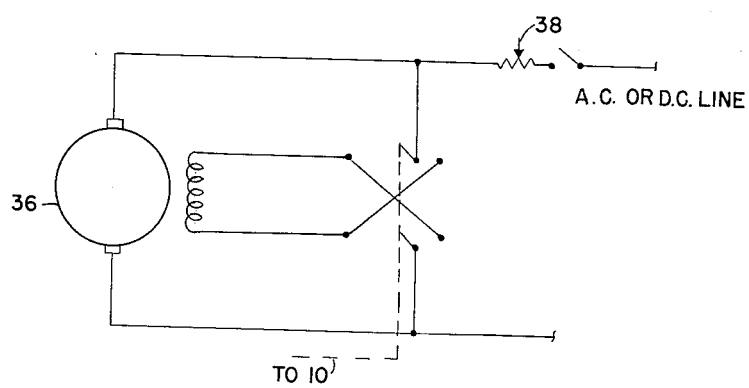

Other objects of the invention will be apparent from the following description and the accompanying drawings, of which Figure 1 is a diagrammatic view of a motor embodying the invention; Figure 2 is a diagrammatic view of a mechanism attached to the motor to enable the motor to reverse and produce reciprocating motion; Figure 3 is a diagrammatic view of an electric circuit connected to an element of the motor to enable the motor to move a load to a predetermined position; Figure 4 is a diagrammatic view of a modified circuit for permitting a motor to move a load to a predetermined position; Figure 5 is a diagrammatic view of switch-means for reversing a three-phase motor; and Figure 6 is a diagrammatic view of a switch-means for reversing an A.C. or D.C. shunt motor.

Referring to the drawings, the numeral 1 designates a motor housing in which is mounted field coils 2. The housing is fitted with bearings 3 in which the armature shaft 4 is adapted to rotate. Mounted rigidly on armature shaft 4 are armature 5 and thrust bearings 6. On the inside of bearings 3, surrounding the armature shaft, are thrust bearings 7. Armature shaft 4 is adapted to rotate in thrust bearings 3 and to move axially therein. Sufficient space is provided between thrust bearings 7 and thrust bearings 6 so that the shaft 4 can move axially a sufficient distance to allow the armature to attain a speed approaching normal operational rotation speed before the thrust bearings abut against each other. Mounted between thrust bearings 6 and 7 on each side of the armature is a coil spring 8 held under compression. The shaft 4 is of sufficient length so that both ends thereof are supported in bearings 3 regardless of the axial movement within the limits permitted by thrust bearings 6 and 7. The shaft 4 is bored and preferably threaded, as shown at 9, to accommodate a threaded shaft 10 formed with an eye 12 at one or both ends thereof.

Instead of threading shafts 4 and 10 so that the two shafts are screwably engaged with each other, the shaft 4 may be formed with internal circumferential grooves, and the shaft 10 formed with a helical groove with balls between the grooves in the manner shown in Patent 2,446,393. The structure for axially moving shaft 10 in shaft 4, by means of cooperating threads on the external and internal surfaces respectively thereof, is considered the full equivalent of the grooves and balls of Russell Patent 2,446,393.

The eye 12 is provided at the end of shaft 10 in order to connect to the shaft a device to be operated thereby. The shaft 10 is movable axially but is prevented from rotating by the load connected to it by means of eye 12.

Although the coil springs 8 are not necessary to the functioning of the motor and impose a small initial starting load on the armature, it is preferred to include these springs to provide for a more gradual rather than a sudden application of the load and to balance the load to some extent at the center of armature travel.

Although an eye 12 has been shown only on one end of shaft 10, it will be understood that both ends of the shaft may be equipped with eyes so that a load can be attached to either end as, for example, where it is desired to operate two pistons or two valves simultaneously, either continuously or intermittently.

The operation of the motor is simple. When the power is turned on and the shaft 10 is loaded, shaft 4 will rotate and at the same time move axially in a direction either to the left or right, depending on the direction in which the current is flowing through the armature. During this period shaft 10 remains stationary. The armature 5 gradually picks up speed so that by the time thrust bearing 6 abuts against thrust bearing 7 on the same side of the armature, the armature has acquired sufficient rotational speed to move shaft 10 and its attached load axially without undue stress on the motor. Since shaft 4 cannot move axially after bearing 6 abuts against bearing 7, shaft 10 will be forced to move axially in one direction or another, depending on the direction of rotation of shaft 4. Shaft 10 will continue to move until rotation of shaft 4 ceases.

Referring to Figure 2, in order to limit the axial movement of shaft 4 and to reverse its direction of movement, the end of shaft 10 extending beyond the end of shaft 4 is fitted with a bracket 13 having elongated arm 14, to each end of which is fastened a plate 15 containing a threaded hole into which fits an adjustable screw-member 16. Mounted between screw-members 16 in their path of movement is toggle-arm 17 of a double-throw electrical switch 18 mounted in the electrical circuit supplying power to the motor. As shaft 10 moves in the right-hand direction and the screw-member 16 engages toggle-arm 17, the switch is opened and then closed again in the opposite direction so as to cause the motor to reverse and drive shaft 10 in the left-hand direction. As the other screw-member 16 engages toggle-arm 17, it will open the switch and close it in the opposite direction, starting the motor again in its reverse direction, causing shaft 10 to move in the left-hand direction. Thus, shaft 10 can be reciprocated in a continuous manner.

If it is desired to utilize the motor to move a device to a given or pre-selected position, a hook-up such as that shown in Figure 3 can be utilized. In this construction, a contact rider 19 is rigidly mounted on the end of shaft 10 by means of a set-screw or other means, and electrically insulated from shaft 10. The contact rider slideably contacts variable resistance 20 connected in parallel with resistance 21 in the circuit for supplying D.C. current to a permanent-magnet-type motor 22. Manipulation of the sliding contact 23 by hand or other means so that the two resistances are unbalanced causes current to flow to the motor and move shaft 10 until the resistances are again balanced and current ceases to flow to the motor.

Figure 4 shows an electrical circuit which may be utilized to position a mechanism driven by means of an A.C. induction motor. The numeral 24 indicates the field coil and armature of the motor supplied by current from alternating-current source 25. Connected in the motor circuit are shading coils 26 and polarized sensitive relay-switch 27, the coil 28 of which is connected between variable resistances 29 and 30 of a potentiometric circuit connected to the A.C. line current. The contact arm 31 of variable resistance 29 may be fastened to shaft 10 in the same manner as described in connection with contact rider 19 of Figure 3. Contact point 32 of variable resistance 30 may be manipulated by means of a calibrated dial 33 or other suitable means. When the resistances 29 and 30 are in balance, current will not flow to the motor. When the resistances are unbalanced by movement of contact point 32, current will flow in one direction or the other, causing movement of shaft 10 until the resistances are again balanced and the motor stops.

Figure 5 illustrates in simple diagrammatic form a double-pole switch 34 connected into the line of a three-phase A.C. motor 35 so that when shaft 10 reciprocates, the switch will be thrown from one closed position to the other, as described in connection with Figure 2, causing the motor to reverse and reciprocate shaft 10. By reason of the fact that the armature attains substantially full operational speed before it picks up the load, the speed of reciprocation is substantially constant throughout the stroke of shaft 10 in either direction.

Figure 6 is a simplified switch showing the circuitry for operating a D.C. shunt motor or Universal shunt motor 36 by means of a double-throw, double-pole switch 37 connected in the line supplying power to the motor through variable resistance 38. The switch 37 is adapted to be operated in the same manner as described in connection with Figure 2.

It will be seen, therefore, that I have provided a motor of simple construction which is adapted to provide reciprocating motion at constant speed or which is adaptable to providing limited motion without overloading the motor due to high starting torque.

I claim as my invention:

1. An electric motor comprising a housing, bearings mounted in said housing, a hollow, internally-threaded shaft mounted in said bearings in such manner as to enable the shaft to rotate and move axially, an armature rigidly mounted on said shaft, field coils mounted in said housing around said armature, an externally-threaded shaft screwably mounted in said hollow shaft, means for limiting the axial movement of said internally-threaded shaft, and means for preventing rotation of said externally-threaded shaft while permitting it to move axially.

2. An electric motor in accordance with claim 1 in which the means for limiting axial movement of said internally-threaded shaft includes thrust bearings rigidly mounted on said shaft on either side of said armature.

3. An electric motor in accordance with claim 2 including two coil springs surrounding said internally-threaded shaft, each being mounted in a state of compression between a bearing mounted in said frame and a thrust bearing.

4. A motor in accordance with claim 1 in which at least one end of said externally-threaded shaft extends outside said internally-threaded shaft, a switch, in the electric circuit supplying power to said motor, adjacent to said end, and means attached to said end for positioning said switch as the externally-threaded shaft moves in opposite axial directions in order to enable the motor armature to reverse its direction of rotation.

5. A motor in accordance with claim 4 in which said means comprises an arm fastened to said shaft end, said arm having oppositely-mounted, spaced, adjustable elements and said switch is mounted between said elements.

6. A motor in accordance with claim 1 in which at least one end of said externally-threaded shaft extends beyond the end of said internally-threaded shaft, an electrical contact is insulated from and mounted on the said shaft end, said contact is mounted to slide along a variable electrical resistance connected in parallel with a second variable resistance in the electrical circuit furnishing power to said motor, and one side of the power line is connected to said contact and the other side of said line is connected to said second variable resistance.

7. A motor in accordance with claim 6 in which the motor is a D.C. motor having permanent-magnet field windings.

8. A motor in accordance with claim 1 in which the motor is an A.C. induction motor, a pair of variable resistances are connected in parallel across the power line to the motor, one of said resistances is operatively connected to said externally-threaded shaft, means are provided for varying said other resistance, a relay coil is connected to said resistances, and a relay switch, operated by said coil, is in the circuit for feeding A.C. current to said motor.

9. A motor in accordance with claim 4 in which the switch is a double-pole, double-throw switch.

10. A motor in accordance with claim 9 in which the motor is a three-phase A.C. motor.

11. A motor in accordance with claim 9 in which the motor is a D.C. shunt motor.

12. A motor in accordance with claim 9 in which the motor is a Universal shunt motor.

13. An electric motor in accordance with claim 1 including means responsive to the axial movement of said externally-threaded shaft for reversing the direction of rotation of said armature when said externally-threaded shaft reaches a predetermined position.

References Cited in the file of this patent

UNITED STATES PATENTS

| | | |
|---|---|---|
| 1,454,777 | Walker | May 8, 1923 |
| 2,696,579 | Van Der Veer | Dec. 7, 1954 |